United States Patent Office 3,117,883
Patented Jan. 14, 1964

3,117,883
PIGMENT FOR AQUEOUS LATEX
EMULSION PAINTS
Allan E. Gilchrist, Fairview Park, Ohio, assignor to The Glidden Company, Cleveland, Ohio, a corporation of Ohio
No Drawing. Filed Sept. 23, 1960, Ser. No. 57,900
7 Claims. (Cl. 106—300)

This invention relates to an improved pigment for air-drying latex emulsion paints, and more particularly for those which are to be made up with the minimum of dispersing facilities.

Heretofore it has been the practice to grind pigmentary material with paint vehicle, ordinarily for a long period of time, to obtain adequate dispersion of the pigment in the resulting paint and to break up aggregates of the pigment. In the production of pre-mixed aqueous latex emulsion paints such as those shown and described in U.S. Patent 2,709,689 it has been the practice to blend together as pigmentary components a white opacifying agent such as titania, needle-like talc particles, tabular spar, plate-like mica particles, spheroidal silica, and a white clay mineral, the clay ordinarily being of quite fine particle size averaging about 1.5–5 microns. In general, the average pigment size ranged from the very fine clay particles and opacifying white particles on up to about 5–15 microns for the rest of the other mineral ingredients.

The invention here involves the discovery that the incorporation of a substantially coarser grade of clay with the opacifying white renders the pigment far more readily dispersible in aqueous mixtures for the preparation of latex paints. Thus, I have found that the incorporation into the pigment containing the opacifying white of about 20–70% of a kaolinite clay of average particle size between 6 and about 12 microns and individual particle size not substantially larger than about 50 microns, where the major portion of the clay particles are characteristically in the form of stacks of plate-like structures not easily delaminated by grinding, substantially enhances the water dispersibility of the pigment while maintaining its smooth texture, non-streaking characteristics, stability after mixing, and especially good washability of the resulting film at high pigment loading per unit of latex binder present. I also have observed higher hiding power with the invention pigments than with corresponding pigments where the same kind of clay was of the conventional pigmentary size averaging 1.5–5 microns. The conventional particle sizes here are often referred to as "equivalent spherical diameters."

By a pigmentary white opacifying agent I, of course, mean to include rutile or anatase titania, lithopone, titanium calcium, white lead, zinc oxide, leaded zinc oxide, and mixtures of same. For the best overall performance the rutile pigmentary titania is preferred. Pigmentary size of the opacifying titania is ideally between about 0.2 and 0.4 micron and generally smaller than 0.5 micron. The other pigmentary whites usually are larger, e.g., the average generally approaching a micron and being less than 2 microns.

The kaolinite clay is preferably a Georgia kaolinite. I have found that kaolinite is superior to fuller's earth and diatomaceous silica in the preparation of aqeuous latex emulsion paints because kaolinite has less water absorption or demand and lower binder demand, and therefore helps to render the paint less prone to exhibiting permanent brush marks. Advantageously, the minimum average particle size of the clay is at least about 7 microns, and the preferred kaolinite for use in my invention has average particle size of about 9.5 microns with a size grading running from about 1.4 microns up to about 20 microns. Its GE brightness relative to magnesium oxide is 79.5–82.5%. In an aqueous slurry the pH is 4.2–5.2. The maximum amount passing a 325 U.S.S. sieve is 0.5%. It has oil absorption of 34% as measured by ASTM D281–31 procedure and a typical aqueous viscosity of 400 centipoises at 64% solids suspended in an 0.535% sodium hexametaphosphate solution (measured with a Brookfield viscosimeter at 10 r.p.m.).

A prime use for the pigment of my invention is as a component of the multiunit aqueous emulsion paint concentrate as described in my co-pending patent application S.N. 50,087, filed August 17, 1960, and entitled Emulsion Paint Concentrate and Process. The disclosure of that application is incorporated expressly into this one by reference.

While I expect that the simplest and most widely used pigments from the practice of my invention will be white ones, the pigment can be colored, if desired, to impart a specific hue to the resultant emulsion paint. Various pigmentary materials which I can employ to color my pigment include: ferrite yellow oxide, ferric oxide, "brown" iron oxide (which is a blend of red, yellow, and black iron oxides), tan oxide of iron, which is a similar blend, raw sienna and burnt sienna, raw and burnt umber, chromium oxide green, phthalocyanine green (chlorinated copper phthalonitrile), the green iron salt of nitroso beta naphthol, copper phthalonitrile blue, ultramarine blue, carbon black, lampblack, toluidine red, parachlor red, para toner (red), alkali resistant red, BON red and maroon, cadmium reds and yellows, Watchung red, madder lake (red), Duratone red, carmine red, chrome yellow (lead chromate), chrome orange, Hansa yellows (which are azo couplings of meta-nitroparatoluidine and acetoacetanilide), and golden nickel azo complexes such as those shown in U.S. Patent 2,396,327.

The pigmentary portion of the pigment base unit can also comprise various specially treated materials such as a pigmented resin or a pigment dispersion in water, nacreous graphite, etc. Suitable specialty pigmentary materials for incorporating into my pigment are shown in the following patents: 2,539,429; 2,613,158; 2,613,159; 2,637,711; 2,722,485; 2,749,248; 2,780,612; 2,865,076; and 2,932,580.

Additionally suitable elemental metal and/or intumescent materials can be incorporated into the pigment of my emulsion. Typical elemental metals include: finely-divided elemental aluminum, copper, bronze, iron, zinc, chromium, tin, molybdenum and the like, suitably in the form of powder, flake, or paste. Intumescent compounds such as borax, antimony trichloride, mono- and diammonium phosphates, guanylurea phosphate, and ureaformaldehyde resins can also be incorporated into the pigment. The pigment of my invention is preferably a powder, but it can be in the form of pellet, brick, paste or other dispersion, as well as powder, or any combination of these forms so desired.

My preferred pigment contains as the white opacifying agent 15–60% rutile titania having average particle size below about 0.5 micron, 20–50% of the special kaolinite stacks of plate-like structures hereinbefore described, 0–30% of needle-like talc particles having average particle size between 5 and 10 microns maximum particle size not substantially above about 30 microns, 5–20% of plate-like mica having average particle size between 8 and 15 microns and maximum particle size not substantially above about 40 microns, 0–20% of spheroidal pigmentary silica having average particle size between 5 and 15 microns and maximum particle size not substantially above about 50 microns, and 0–30% of wollastonite tabular spar having average particle size between 5 and 10 microns and maximum particle size not substantially above about 30 microns. When the wollastonite is substituted for the talc, I have found that the pigment is more easily wetted by water with a minimum of hand mixing.

The most suitable titania for use in my pigment is a highly water dispersible grade such as one that has been calcined in the presence of potassium salts and phosphoric acid or ammonium phosphate to leave a phosphate residue of about 0.25% on the titania. Alternatively, surface active agents such as dodecyl benzene, sodium sulfate, dodecyl benzene diethanolamine, a higher alkyl phenoxy polyethoxy ethanol having 8–24 ethylene oxide equivalents per mole of the alkyl phenol, condensation products of ethylene and propylene oxides, and the like can be milled onto the titania and/or other portions of the pigment to assist in causing it to disperse easily in water.

In the preparation of the aqueous emulsion paints in accordance with my aforementioned co-pending patent application using hand mixing it is important to use a water dispersible bodying agent having viscosity of at least 100 centipoises when in 2% aqueous solution at 20 C. The preferred such bodying agent is hydroxy ethyl cellulose. Advantageously it has said viscosity of 200–25000 centipoises, and preferably from about 3500 to 6000 centipoises. Other suitable bodying agents include fine bentonite clay, alkali metal caseinates, sodium carboxy methyl cellulose, methyl cellulose, natural gums including gum tragacanth, locust bean gum, caraya gum, guar gum, Irish moss gum, alkali metal alginates, carboxy methyl dextran, sodium polyacrylates, ethylene oxide polymers, and polyacrylamides.

Broadly, the proportion of hydroxy ethyl cellulose that I find advantageous is 0.1–5% based on the weight of the pigment and preferably it is 0.8–2%. The other bodying agents require a higher proportion and some of them tend to impart brush mark characteristics to the resulting aqueous latex emulsion paint films. The bodying agent should be of particle size not substantially in excess of 150 microns (the largest dimension) to give a pigment mix least prone to forming lumps in the resulting paint when the paint is made up using a simple paddle stirrer with hand stirring as would be done in an ordinary domestic situation. Grinding of at least a major portion of the bodying agent used with the pigment or applying it to the pigment as an aqueous colloidal dispersion or in water solution are also effective techniques. For brevity they will be called "milling" of the bodying agent onto the pigment or onto a fraction thereof.

For most rapid dispersion also a minute amount of a dispersing assistant is desirable in the pigment. Preferably I use an alkali metal phosphate such as 0.05–0.2% of sodium hexametaphosphate, tetrasodium pyrophosphate, and/or trisodium phosphate. More broadly I can use 0.01–0.5% of such phosphate dispersing assistant.

Other dispersing assistants I can employ with the alkali metal phosphates include pine oil, tributyl phosphate, and lecithin. Surfactants of the anionic type such as dodecyl benzene sodium sulphate, or dodecyl benzene diethanol amine, nonionic surfactants such as a higher alkyl phenoxy polyethoxy ethanol having 8–24 ethylene oxide units per mole of the alkylphenol, and the sodium or ammonium salts of sulfate esters of such nonionic surfactants (which converts them, therefore, into anionic ones) are also useful in place of or to supplement the alkali metal phosphates. Effective proportions of such surfactants are generally a little higher than those for the alkali metal phosphate dispersing assistants. Use of too great a proportion of such surfactants causes the resulting paint to have poor water resistance.

Other suitable additives for the pigment such as efflorescence-reducing materials for use in masonry paints, pesticides and fungicides, etc. also can be incorporated into the pigments of my invention and are shown in my aforementioned co-pending patent application.

The following examples show ways in which my invention has been practiced but should not be construed as limiting the invention. The particular paints compounded from the invented pigments shown here were mixed in open vessels for brushing and, in most cases, could be thinned with water for spraying.

*Example 1*

An aqueous latex was made by emulsion polymerization of vinyl acetate monomer and 2-ethyl hexyl acrylate monomer by feeding these monomers into the balance of the mixture which was agitated and heated to 140° F. to initiate the reaction. The kettle used was equipped with a distilling column maintained at total reflux. The reaction period was 14–16 hours. The proportons of reaction mixture were as follows:

| | Lbs. |
|---|---|
| Deionized water | 100.00 |
| Sodium bicarbonate | 0.47 |
| Sodium dodecylbenzene sulfonate | 1.51 |
| Nonionic surfactant [1] | 3.67 |
| Hydroxy ethyl cellulose having in 2% water solution at 20° C. a viscosity of 8–12 cups | 1.00 |
| Potassium persulfate | 0.23 |
| 2-ethyl hexyl acrylate monomer | 18.00 |
| Vinyl acetate monomer [2] | 82.00 |

[1] A blend of 1.51 lbs. of iso-octyl phenoxy polyethoxy ethanol containing 9 to 10 ethylene oxide units per mole of the alkyl phenol and 2.16 lbs. of a similar compound except that it contained about double the moles of ethylene oxide units per mole of the alkyl phenol.
[2] Stabilized with 0.002% of hydroquinone.

A 725-gram portion of the resulting aqueous latex, containing about 50% latex solids, was further compounded with 5 grams of pine oil, and this compounded material was maintained in a discrete package.

A pigment base was made of the following listed components by pre-mixing them in a hammer mill in the following proportions:

| | Grams |
|---|---|
| Classified kaolinite clay having particle size range between 1.4 and 20 microns and averaging 9.5 microns, the conformation of which was stacks of plate-like structures. Virtually no particles were smaller than 2 microns | 625 |
| Talc (calcium silicate) having an average particle size of 7 microns and a size range between 1.55 and 28 microns, needle-like particles | 375 |
| White muscovite mica having average particle size of 10–11 microns | 200 |
| Pine oil dispersant | 5 |
| Hydroxy ethyl cellulose [1] of particle size 100 mesh (U.S.S.) and finer, having 98.5% water solubility and viscosity in 2% aqueous solution of 3500–5000 centiposes at 20° C. | 25 |
| Rutile pigmentary titania | 525 |
| Sodium hexametaphosphate powder | 1.5 |
| Sodium ortho phenyl phenol (a pesticide) | 5 |

[1] Milled "Cellosize WP–4400" a product of Union Carbide Co. having pH at 25° C. and pH in 2% aqueous solution of 6–8, maximum ash content of 6%, and maximum water content of 5%.

This pigment was packaged, the package unit of 1761.5 grams emptied into a mixing container containing 2465 grams of water, and the whole stirred by hand with a paddle for about three minutes. Then the 730-gram package of aqueous compounded latex was emptied into the resulting slurry, and the stirring was continued for about two minutes whereby a gallon of aqueous latex emulsion paint was made.

After about 5 minutes of standing the paint was brushed out on a test board. It demonstrated an excellent ease of application, non-streaking, a hold-open time of about 5 minutes, and a viscosity which prevented the paint from dripping or running off the brush. A few lumps which were apparent were easily brushed out of the paint. It air-dried to give superior scrub resistance after about 15 minutes drying (200 strokes with a wet rag in soap to eliminate marks made by lead pencil, wax crayon and lipstick).

*Example 2*

Three experimental paints were made up in one-pint samples. The procedure used was identical to that used in Example 1. The first paint was like the paint in Example 1. The second paint was like the paint of Example 1, except that the kaolinite clay used had an average particle size of 5 microns and a size range from about 0.3 to about 30 microns. The third paint was like that of Example 1, except that the kaolinite clay used had average particle size of 0.6 micron and size range between about 0.3 micron and 4 microns.

The first pigment mixed into the water more easily than did the other two to give an ostensibly homogeneous slurry with hand stirring before adding the latex. Each paint was tinted blue with 1 cc. of a 10% dispersion of copper phthalocyanine toner, the suspending agent for the pigment in this toner being 67% of 2-ethoxy ethanol-1 and 33% of the nonionic surfactant isooctylphenoxy polyethoxy ethanol having an average of 9–10 ethylene oxide units per mole of the alkylated phenol. The first paint was the most easily blended with the toner by hand stirring to give a uniform non-streaking light blue color. The second paint was intermediate in this respect, and the third paint the most difficult to so blend.

Shortly after the toning the viscosity of the three paints was measured at room temperature on a conventional Brabender machine operating at 200 r.p.m. using a single flag paddle. The first paint had viscosity of 420 Brabender units and brushed out easily onto cardboard to a smooth film with very few visible lumps. The second paint had a viscosity of 450 Brabender units and gave a slightly lumpy film when similarly brushed out. The third paint had a viscosity of 440 Brabender units and brushed out to give a very lumpy film. Soaking out of the lumps in the third paint in time would cause this viscosity to move up to an undesirably high range for brush flow.

The three paints were also applied to Morest cards and scraped to a film thickness of about 0.0005 inch. After air-drying the first paint gave the least glossy and most desirably flat film, and the third paint exhibited the glossiest film on the cards. Washing of the films by stroking them with a damp, soapy rag, showed the first paint to have about twice the resistance to washing that the third paint had in terms of strokes necessary to break through the film and about 20% greater washability than the second paint.

*Example 3*

To 1575 grams of the white pigment base made like that of Example 2 there was mixed pigmentary particles of: 143 grams of red iron oxide, 28 grams of red toluidine toner (an azo pigment coupling of meta-nitro-para-toluidine and beta-naphthol) and 14 grams of ferrite yellow oxide (hydrated ferric oxide). Using the resulting pigment unit (of 1760 grams) with a package of 730 grams of compounded latex of the sort used in Example 1 blended into 2465 grams of water in the manner of Example 1 there resulted a gallon of red aqueous emulsion paint having the desirable properties shown in Example 1.

*Example 4*

A yellow pigment base unit was made by mixing 71 grams of Hansa yellow (an azo coupling of meta-nitro-para-toluidine and acetoacetanilide), 14 grams of ferrite yellow and 1672 grams of the white pigment mixture of the kind used in Example 1. A gallon of yellow paint was made from this pigment and aqueous compounded latex in the same manner as Example 3. It exhibited the desirable aqueous latex emulsion paint properties shown in Example 1.

*Example 5*

In a further preparation a pigment base unit was made from 1520 grams of the white pigment base like that of Example 1 plus 198 grams of burnt umber and 43 grams of ferrite yellow pigment. When mixed with water and aqueous compounded latex like the pigment base unit of Example 3, a gallon of brown aqueous latex emulsion paint was made. It exhibited the desirable characteristics of the paint shown in Example 1.

*Example 6*

A package of white aqueous compounded latex like that of Example 1 was tinted blue with 2 ounces of a 10% dispersion of copper phthalocyanine toner, the suspending agent for the pigment in this toner being 67% 2-ethoxy-ethanol-1 and 33% of the nonionic surfactant iso-octylphenoxy polyethoxy exthanol having an average of 9–10 ethylene oxide units per mole of alkylated phenol. The resulting tinted latex was mixed with 1761.5 grams of a pigment base unit like that of Example 1 and 2465 grams of water to give a gallon of an excellent blue aqueous latex emulsion paint. It performed essentially like the paint of Example 1 except that it was slightly less scrubbable.

*Example 7*

In a similar preparation to that of Example 6 the latex was tinted red with red toluidine toner pigment (an azo pigment coupling of meta-nitro-para toluidine and beta naphthol) similarly suspended in 2-ethoxy-ethanol-1 and nonionic surfactant to give a red aqueous latex emulsion paint of essentially the same characteristics as that of Example 6.

*Example 8*

Additionally, batches of white paint made like that of Example 1 were tinted individually in the proportion of 2 ounces per gallon with the foregoing blue and red toners of Examples 6 and 7, respectively, and the paints were essentially the same in characteristics as their counterparts in Examples 6 and 7.

I claim:

1. A pigment mixture having improved dispersibility for incorporation into aqueous latex emulsion paints, said pigment mixture consisting essentially of pigmentary titania having particle size between about 0.2 and 0.4 micron and about 20–70% of kaolinite clay of average particle size between about 6 and about 12 microns, the preponderance of individual clay particle size not substantially larger than about 50 microns, the major portion of said clay particles being characteristically in a form of stacks of plate-like structures.

2. The pigment of claim 1 wherein the pigmentary white opacifying agent is rutile titania, and in addition to the kaolinite there is included at least one pigmentary extender selected from the group consisting of needle-like talc particles having average particle size between 5 and 10 microns and maximum particle size not substantially above about 30 microns, plate-like mica having average particle size between 8 and 15 microns and maximum particle size not substantially above about 40 microns, spheroidal silica having average particle size between 5 and 15 microns and maximum particle size not substantially above about 50 microns, and wollastonite tabular spar having average particle size between 5 and 10 microns and maximum particle size not substantially above about 30 microns.

3. The pigment of claim 2 wherein there is 15–60% of titania, 20–50% of kaolinite, 0–30% of talc, 5–20% of mica, 0–20% of silica, and 0–30% of wollastonite.

4. The pigment of claim 2 wherein there is included a dispersing assistant which facilitates the water wetting of the pigment by reducing interfacial tension of the pigment relative to water and a water-dispersible bodying agent exhibiting viscosity of at least 100 centipoises when at 2% concentration in aqueous solution at 20° C.

5. The pigment of claim 4 wherein the bodying agent is of particle size not substantially in excess of 150 microns.

6. The pigment of claim 4 wherein the dispersing assistant includes an alkali metal phosphate in the proportion of 0.01 to 0.5% based on the weight of the pigment, and the bodying agent is hydroxy ethyl cellulose in the proportion of 0.1 to 5% based on the weight of the pigment, said hydroxy ethyl cellulose exhibiting at least 100 centipoises viscosity in 2% aqueous solution at 20° C.

7. The pigment of claim 1 wherein there is incorporated at least one compound intumescent when heated and selected from the group consisting of borax, antimony trichloride, monoammonium phosphate, diammonium phosphate, guanylurea phosphate, and ureaformaldehyde resins.

References Cited in the file of this patent

UNITED STATES PATENTS

| | | |
|---|---|---|
| 2,709,689 | Herzog et al. | May 31, 1955 |
| 2,974,054 | Beamesderfer et al. | Mar. 7, 1961 |
| 2,981,630 | Rowland | Apr. 25, 1961 |
| 3,022,185 | Delfosse | Feb. 20, 1962 |